US007269681B1

(12) United States Patent
Hypher et al.

(10) Patent No.: US 7,269,681 B1
(45) Date of Patent: Sep. 11, 2007

(54) ARRANGEMENT FOR RECEIVING AND TRANSMITTING PCI-X DATA ACCORDING TO SELECTED DATA MODES

(75) Inventors: Austen John Hypher, Newton, MA (US); Richard W. Reeves, Westboro, MA (US); Gerald Robert Talbot, Concord, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 344 days.

(21) Appl. No.: 11/000,062

(22) Filed: Dec. 1, 2004

(51) Int. Cl.
*G06F 13/36* (2006.01)
*G06F 1/04* (2006.01)

(52) U.S. Cl. .................. 710/314; 710/306; 710/310; 710/311; 713/600

(58) Field of Classification Search .............. 710/25, 710/306, 311, 314, 500, 600, 305, 310, 315; 713/500, 600

See application file for complete search history.

(56) References Cited

U.S. PATENT DOCUMENTS

| | | | | |
|---|---|---|---|---|
| 5,625,831 A | * | 4/1997 | Priest et al. ................ | 713/500 |
| 5,761,100 A | * | 6/1998 | Itoh et al. ................... | 708/270 |
| 6,430,696 B1 | * | 8/2002 | Keeth ........................ | 713/503 |
| 6,446,180 B2 | * | 9/2002 | Li et al. ..................... | 711/167 |
| 6,640,277 B1 | * | 10/2003 | Moertl ....................... | 710/305 |
| 7,019,574 B2 | * | 3/2006 | Schrodinger ................ | 327/175 |
| 2003/0035097 A1 | * | 2/2003 | Lai et al. .................... | 356/5.01 |

OTHER PUBLICATIONS

Advanced Micro Devices, Inc. AMD-8131™ HyperTransport™ PCI-X® Tunnel Data Sheet, 24637 Rev. 3.02, pp. 1-87, Aug. 10, 2004.
"PCI-X Electrical and Mechanical Addendum to the PCI Local Bus Specification Revision 2.0a", Appendix C, pp. 123-150, Aug. 22, 2003.
"82093AA I/O Advanced Programmable Interrupt Controller (IOAPIC)", May 1996, pp. 1-20, Intel Corporation.
"PCI-X Electrical and Mechanical Addendum to the PCI Local Bus Specification Revision 2.0a", p. 1-108, Aug. 22, 2003.

* cited by examiner

*Primary Examiner*—Mark H. Rinehart
*Assistant Examiner*—Jeremy S Cerullo
(74) *Attorney, Agent, or Firm*—Manelli Denison & Selter PLLC; Leon R. Turkevich

(57) ABSTRACT

An integrated device (e.g., an integrated PCI bridge device) buffers received PCI bus strobe signals and distributes strobe signals for PCI receive data relative to the PCI data lines, enabling all PCI receive data to be latched using locally-generated PCI strobe signals generated based on the same PCI bus strobe signals. In addition, data line latch modules having primary and secondary flip-flops enable the PCI receive data to be held for an entire clock cycle, optimizing conversion between a PCI clock domain and a local clock domain of the PCI bridge device. A transmission circuit also can be configured to transmit data according to either double data rate (DDR) mode or quad data rate (QDR) mode in an efficient manner.

13 Claims, 8 Drawing Sheets

ARRANGEMENT FOR RECEIVING AND TRANSMITTING PCI-X DATA ACCORDING TO SELECTED DATA MODES

BACKGROUND OF THE INVENTION

1. Field of the Invention

The present invention relates to integrated network devices having Peripheral Component Interconnect (PCI) bridges.

2. Background Art

Peripheral Component Interconnect (PCI) interfaces have been used to provide high-speed connectivity between devices in a multi-device system, such as a processor based system such as a personal computer.

FIG. 1 is a diagram illustrating a conventional implementation of a PCI bus system architecture 100. The system 100 includes a processor 102 coupled to a memory controller 104 via a local bus 106. The processor 102 and the memory controller 104 are coupled to a PCI local bus 106 (labeled PCI Local Bus #0) via a host bridge 108.

The host bridge 108 provides a low latency path through which the processor 102 may directly access PCI devices 110, for example a network interface card 110a providing access to a local area network, a disc drive (SCSI) controller 110b providing access to disk drives 114, an audio card 110c, a motion picture card 110d, or a graphics card 110e configured for driving a monitor 116. The host bridge 108 also provides a high bandwidth path allowing PCI masters on the PCI bus 106 direct access to the system memory 118 via the memory controller 104. A cache memory 120 is independent of the system memory 118 for use by the processor 102.

The term "host bridge" refers to the bridge device 108 that provides access to the system memory 118 for the devices 110 connected to the PCI bus 106. A PCI-to-PCI bridge 122 also may be used to connect a second PCI bus 124 to the PCI bus 106, the second PCI bus 124 configured for connecting other I/O devices 126.

Newer PCI bus protocols are being published, including PCI-X Mode 2, that provide enhanced PCI functionality. These newer PCI bus protocols include the PCI Local Bus Specification, Rev 2.3, the PCI-X Protocol Addendum to the PCI Local Bus Specification, Rev. 2.0a, and the PCI-to-PCI Bridge Architecture Specification, Rev 1.2.

The PCI-X Electrical and Mechanical Addendum to the PCI Local Bus Specification Revision 2.0a, Aug. 22, 2003 (hereinafter "PCI-X E/M Addendum"), specifically "Appendix C—PCI-X Mode 2 Device Design Guidelines and Examples" describes on pages 123-132 a proposal for implementing Double Data Rate (DDR) and Quad Data Rate (QDR) transmissions. In particular, the PCI data on the PCI-X bus is edge triggered (i.e., data is valid on the PCI-X bus when the PCI clock transitions from one state to another), such that the PCI data is latched on each rising and falling clock edge.

The implementation as suggested in the Appendix C suffers from the disadvantage that the disclosed technique for latching incoming data from the PCI-X bus creates numerous timing synchronization problems. According to the proposed implementation, multiple flip-flops inside the PCI device are arranged into an array for storing the incoming PCI data, where a selected flip-flop is used for latching a corresponding PCI data bit: decision logic outputs a signal used as the clock for latching the data into the selected flip-flop.

However, the proposed implementation as suggested in the Appendix C suffers from the disadvantage that the timing within the device is harder to predict, resulting in timing synchronization problems during implementation, for example due to implementation variations such as aligning strobe signals with the data, differences in board wire lengths, duty cycle variations, variations between drivers, and data pattern intersymbol interference.

SUMMARY OF THE INVENTION

There is a need for an arrangement that enables an integrated (i.e., single-chip) device, for example an integrated PCI bridge device, to transmit and receive PCI-X data according to double data rate (DDR) mode or quad data rate (QDR) mode, in an efficient manner that minimizes timing variations between clock signals and data signals.

These and other needs are attained by the present invention, where a PCI bridge device buffers received PCI bus strobe signals and distributes strobe signals for PCI receive data relative to the PCI data lines, enabling all PCI receive data to be latched using locally-generated PCI strobe signals generated based on the same PCI bus strobe signals. In addition, data line latch modules having primary and secondary flip-flops enable the PCI receive data to be held for an entire clock cycle, optimizing conversion between a PCI clock domain and a local clock domain of the PCI bridge device. A transmission circuit also can be configured to transmit data according to either double data rate (DDR) mode or quad data rate (QDR) mode in an efficient manner.

One aspect of the present invention provides an integrated PCI bridge device, the integrated PCI bridge device comprising first and second PCI interfaces. Each PCI interface includes a plurality of PCI bus latching modules configured for receiving respective prescribed groups of PCI data lines. Each PCI bus latching module has a plurality of data line latch modules, each data line latch module configured for latching from a corresponding PCI data line, according to the one data rate mode, first and second PCI data values based on respective locally-generated first and second PCI strobe signals. Each data line latch module further includes first and second buffers configured for generating the corresponding locally-generated first and second PCI strobe signals based on respective first and second PCI bus strobe signals received from the PCI bus. Each data line latch module is configured for holding the corresponding first and second PCI data values for at least a clock cycle of the respective locally-generated first and second PCI strobe signals. Each first and second PCI interface further includes means for outputting output data onto the corresponding prescribed group of PCI data lines according to the one data rate based on a data rate configuration signal.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment of the arrangement for using transmitting and receiving PCI-X data according to double data rate or quad data rate will be described in detail following an overview of the architecture of the HyperTransport™ tunnel/PCI-X bridge.

Architecture Overview

Figure 2:
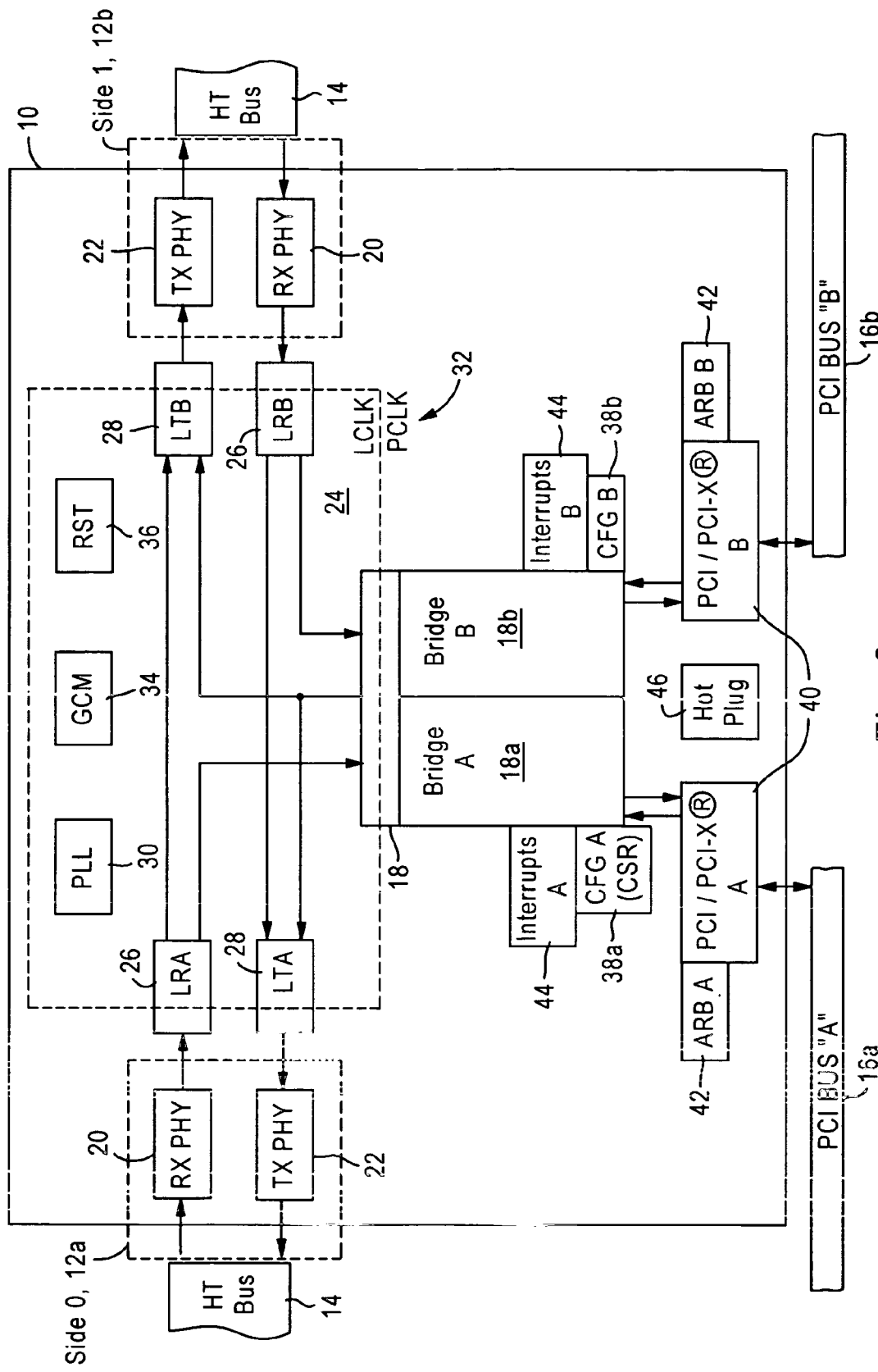
FIG. 2 is a diagram of a PCI host bridge device according to an embodiment of the present invention.

FIG. 2 is a diagram illustrating the transport tunnel-to-PCI host bridge device 10, according to an embodiment of the present invention. The transport tunnel-to-PCI host bridge device 10, preferably implemented as an integrated circuit on a single chip, is configured for operating as a HyperTransport™ (HT) tunnel device according to the HyperTransport™ IO Link Specification, Rev. 2.0, including errata up to specification Rev. 1.05c.

The transport tunnel-to-PCI host bridge device 10 includes two HT interfaces 12a and 12b labeled "Side 0" and "Side 1", respectively. HT packets received by a given interface (e.g., 12a) from an HT bus 14 can be passed through the device 10 to the other interface (e.g., 12b) (i.e., tunneled), enabling multiple HT tunnel devices to be connected serially (e.g., a daisy-chain arrangement) to form an HT chain on the bus 14 for transfer of HT packets.

The following nomenclature may assist in describing connections in serially connected HT tunnel devices. The HT interface (e.g., 12a) that is connected to (or toward) a HyperTransport™ host device (e.g., a host memory controller) is referred to as the "upstream" interface, and the other HT interface (e.g., 12b) is referred to as the "downstream" interface: if the upstream interface (e.g., 12a) is directly connected to the HyperTransport™ host device via the corresponding connected HT tunnel 14, then that tunnel connecting the upstream interface to the HyperTransport™ host device is referred to as the "upstream link"; if the upstream interface (e.g., 12a) is connected to a second HT device via an HT tunnel, where the second HT device provides a connection to (or toward) the HyperTransport™ host device, then that HT tunnel connecting the upstream interface and the second HT device is referred to as the "upstream tunnel". Note that the downstream interface may or may not be connected to another HT device or chain of devices.

The transport tunnel-to-PCI host bridge device 10 also provides bridging operations between the HT bus 14 and PCI buses 16a and/or 16b. In particular, the transport tunnel-to-PCI host bridge device 10 contains two independent HT-to-PCI-X bridges 18a and 18b in accordance with the HyperTransport™ Link Specification, Rev. 2.0, the PCI Local Bus Specification, Rev 2.3, the PCI-X Protocol Addendum to the PCI Local Bus Specification, Rev. 2.0a, and the PCI-to-PCI Bridge Architecture Specification, Rev 1.2. The transport tunnel-to-PCI host bridge device 10 includes configurable registers (38a, 38b) that identify the address ranges utilized by each of the PCI bus 16a, the PCI bus 16b, and the HT bus 14.

Also note that the device 10 may identify a destination for a received HT packet based on a device identifier and bus identifier specified in the HT packet; alternately the device 10 may be configured to identify a destination bridge (e.g., 18a, 18b) based on a corresponding unit identifier (e.g., 181, 182) according to HyperTransport™ protocol. In addition, the transport tunnel-to-PCI host bridge device 10 includes configuration (CFG) registers 38a, 38b: the configuration register 38a includes command and status registers (CSRs) within prescribed address spaces used by the transport tunnel-to-PCI host bridge device 10 for internal configuration, in accordance with the above-described PCI and HyperTransport™ specifications. Hence, the transport tunnel-to-PCI host bridge device 10 can store configuration information to an addressable CSR based on identifying an HT packet specifying a device identifier for the device 10.

Hence, the transport tunnel-to-PCI host bridge device 10 can either tunnel HT packets received from the HT bus 14 by passing the packets from one interface (e.g., 12a) to the other interface (e.g., 12b), or the transport tunnel-to-PCI host bridge device 10 can pass the HT packets to one of the PCI buses 16a or 16b via the corresponding bridge 18a or 18b. Also note that the transport tunnel-to-PCI host bridge device 10 can process and respond to a received HT packet that is destined for the transport tunnel-to-PCI host bridge device 10 (e.g., for storage of configuration data).

The bridges 18a and 18b of the transport tunnel-to-PCI host bridge device 10 also forward onto the HT bus 14 any data having been received from the respective PCI buses 16a or 16b that specify a destination address within the prescribed address range specified within the CSRs for the HT bus 14.

Each of the HT interfaces 12a and 12b includes a receive physical layer transceiver (RX PHY) 20 and a transmit physical layer transceiver (TX PHY) 22. Each of the PHYs 20 and 22 include synchronization First-in-First-out (FIFO) registers for buffering packets according to a prescribed HT clock domain, and compensation circuitry to ensure electrical compliance with the HyperTransport™ specification. In particular, the RX PHY receives a packet and a clock associated with the packet according to the HT clock domain on the bus 14; the FIFO registers in the PHYs 20 and 22 are used to transition between the HT clock domain and a local clock (LCLK) domain 24.

The device 10 includes a local clock (LCLK) domain 24 that relies on a clock that is independent of any variations in clocks driven by the HT bus 14. The device 10 includes, within the local clock domain 24, receive logic 26 and transmit logic 28 for each of the HT interfaces 12 and 12b. The device also includes a phase locked loop (PLL) circuit 30 configured for generating the local clock (LCLK) and a phase-controlled clock (PCLK) 32, and maintaining synchronization of those clocks as needed.

The receive logic 26 is configured for determining whether a received HT packet from the HT bus 14 should be forwarded to the corresponding transmit logic 28 for tunneling of the HT packet, whether the received HT packet should be forwarded to the bridge 18 for internal configuration of the device 10, or forwarded to the bridge 18 for transfer of the received HT packet onto a determined one of the PCI buses 16a or 16b.

The device 10 also includes within the local clock domain a link interface cycle manager (GCM) 34. The GCM 34 is configured for arbitrating the order of transactions that are to occur within the local clock domain 24. For example, the GCM 34 may arbitrate between transactions that are to be output by the transmit logic (LTA) 28. The reset logic (RST) 36 is configured for managing reset and device initialization operations, including implementing test and diagnostic modes.

The HT-to-PCI bridge 18 is configured for transferring HT packets, forwarded from the HT bus 14 by one of the receive logic blocks (e.g., LRA or LRB) 26, to one of the PCI buses 16a or 16b. In particular, the receive logic block 26 having received the HT packet will specify to the bridge 18 the PCI bus (e.g., 16a) on which the HT packet is to be output. The HT-to-PCI bridge 18 also is configured for transferring packets from one of the PCI buses 16a or 16b to one of the transmit logic blocks (e.g., LTA or LTB) 28 for output onto the HT bus 14. The bridge 18 (e.g., the bridge 18a) identifies the destination address of the HT packet as falling within the address range of either the PCI bus (e.g., 16a) or the configuration space of the configuration register (e.g., 38a), and forwards the packet accordingly.

The device 10 also includes, for each PCI bus (e.g., 16a, 16b), a bridge 18a and 18b, the configuration registers 38a and 38b, a PCI interface module 40, a PCI arbitration module 42, and an interrupt controller 44. The device 10 also includes a hot plug module 46. The configuration registers 38a and 38b include registers, addressable via the HT bus 14, for configuration of the respective components associated with bus operations for the respective PCI buses 16a and 16b. Each PCI interface module 40 is configured for transmitting and receiving PCI data bursts according to the above-identified PCI specifications. Each PCI arbitration module 42 is configured for managing PCI bus arbitrations for the corresponding attached PCI bus (e.g., 16a or 16b), including identifying a bus master for PCI bus transactions. Each interrupt controller 44 is configured for servicing interrupts detected on the corresponding PCI bus (e.g., 16a or 16b), as well as interrupts generated according to prescribed I/O Advanced Programmable Interrupt Controller (IOAPIC) specifications. Hence, various interrupt methods may be implemented in the interrupt controllers 44.

The hot plug module 46 is configured for managing hot plug operations based on prescribed configuration registers in the registers 38a and/or 38b, where a selected PCI slot or device can be powered down while the device 10, as well as other PCI devices on the PCI bus, remain in a powered state. For example, the hot plug module 46 may include logic that is compliant with the Standard Hot Plug Circuitry (SHPC) specified in the above-described PCI specifications; alternative implementations also may be included in the hot plug module 46, for example logic configured for interfacing with commercially-available power controllers, including the TPS2340A or the TPS2342 power controllers commercially available from Texas Instruments, Inc.

Transmitting and Receiving PCI Data According to DDR or ODR Modes

Figure 3:
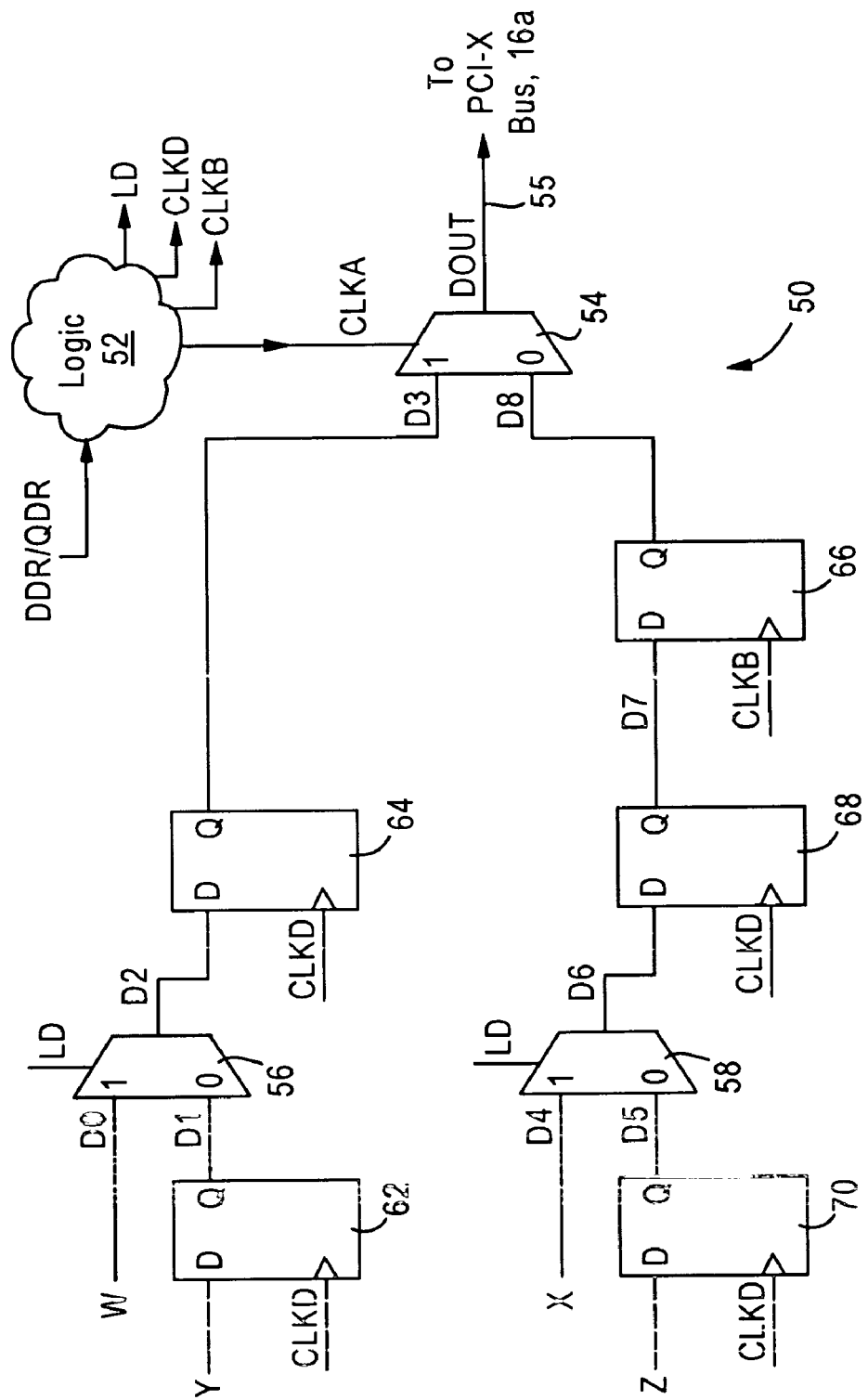
FIG. 3 is a diagram illustrating a transmission circuit according to an embodiment of the present invention.
Figure 4:
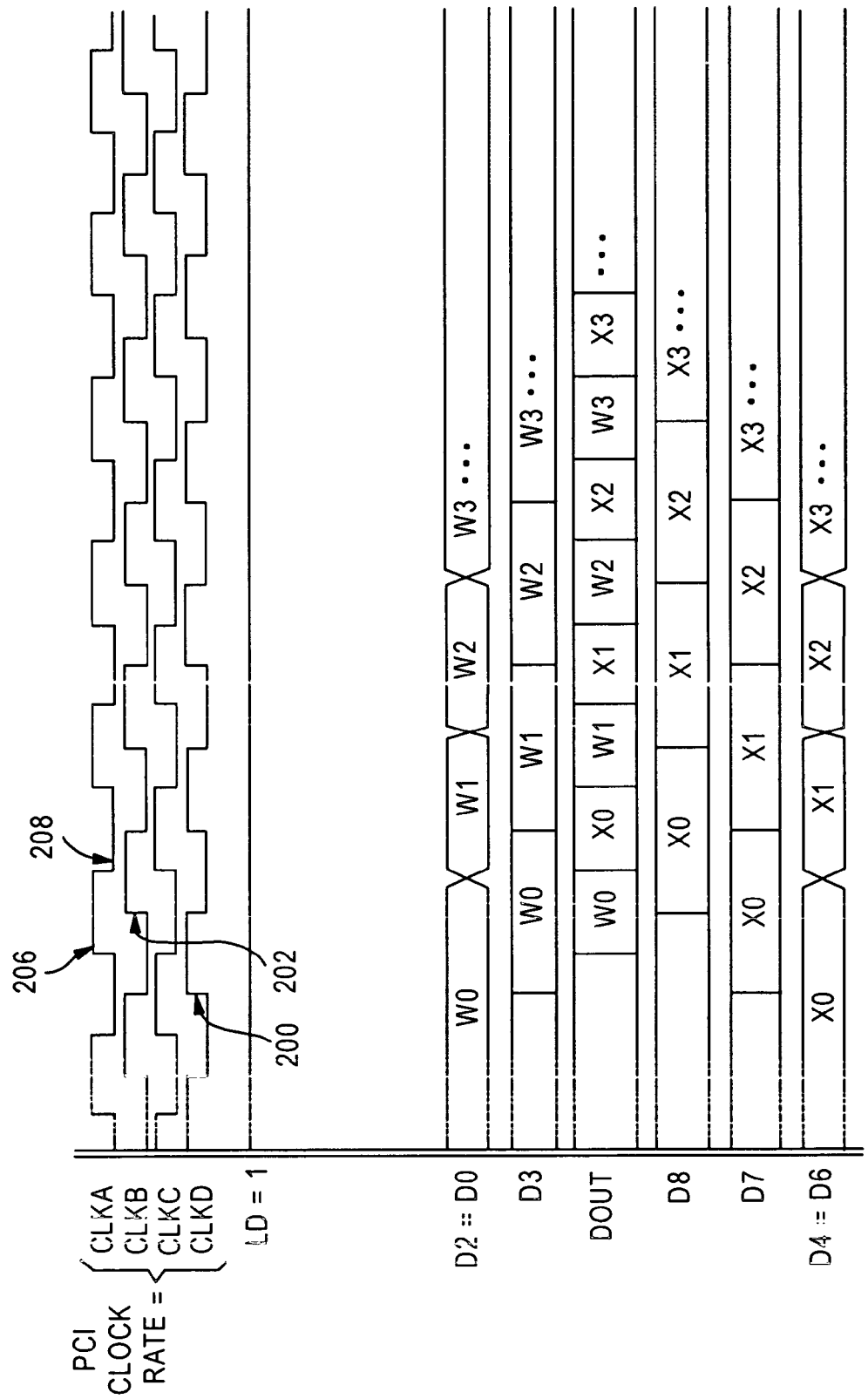
FIG. 4 is a timing diagram illustrating the transmission circuit of FIG. 3 operating according to double data rate (DDR) mode, according to an embodiment of the present invention.

FIG. 3 is a diagram illustrating a transmission circuit (i.e., an output cell) 50 configured for selectively outputting a corresponding PCI data bit onto the PCI-X bus (e.g., 16a) at either Double Data Rate (DDR) mode or Quad Data Rate (QDR) mode, according to an embodiment of the present invention. Each PCI interface 40 includes a plurality of cells 50, each cell 50 configured for outputting data onto a corresponding bit line (or data pin) 55. The transmission circuit 50 includes logic 52 configured for outputting clock signals CLKA, CLKB, and CLKD, and multiplexer selection signal LD. As illustrated in FIG. 4, the logic 52 outputs the clock signals such that the clock signal CLKB leads the clock CLKD by a phase difference of 180°, and the clock signal CLKA leads the clock signal CLKB by a phase difference of 90° (clock signal CLKC is not used).

The transmission circuit 50 also includes multiplexers 54, 56, and 58, and flip-flops 62, 64, 66, 68, and 70.

The transmission circuit 50 is configured for receiving PCI data from the bridge device 10 as parallel inputs: the transmission circuit 50 receives the data inputs W, X in DDR mode, and the data inputs W, X, Y, Z in QDR mode.

The logic 52 is configured for causing the data inputs to be output onto a PCI data path 55 as a serial stream based on the PCI configuration (e.g., W, X in DDR, W, X, Y, Z in QDR). For example, in the Double Data Rate (DDR) configuration, only the data inputs W and X are supplied to the respective multiplexers 56 and 58 via the respective signal paths D0 and D4. Hence, the logic 52 sets the mux selection input (LD) to "1", such that the multiplexers 56 and 58 output the data inputs W and X from the signal paths D0 and D4 onto the signal paths D2 and D6, respectively. In addition, in DDR configuration the logic 52 outputs the clock signals (CLKA, CLKB, and CLKD) at the PCI clock rate. The outputs D2 and D6 of the multiplexers 56 and 58 are synchronously latched by the flip-flops 64 and 68, respectively, at the rising edge of the supplied clock signal (CLKD). The output D7 of the flip-flop 68 is latched by the flip-flop 66 based on a second clock (CLKB).

Hence, the data value output by the flip-flop 66 onto signal path D8 is delayed relative to the data value output by the flip-flop 64 onto signal path D3 by half a clock cycle. Consequently, the selection input (CLKA) for the multiplexer 54 causes the data output (DOUT) to have a data rate that is twice the rate of the original input streams on input paths D0 and D4.

Figure 5:
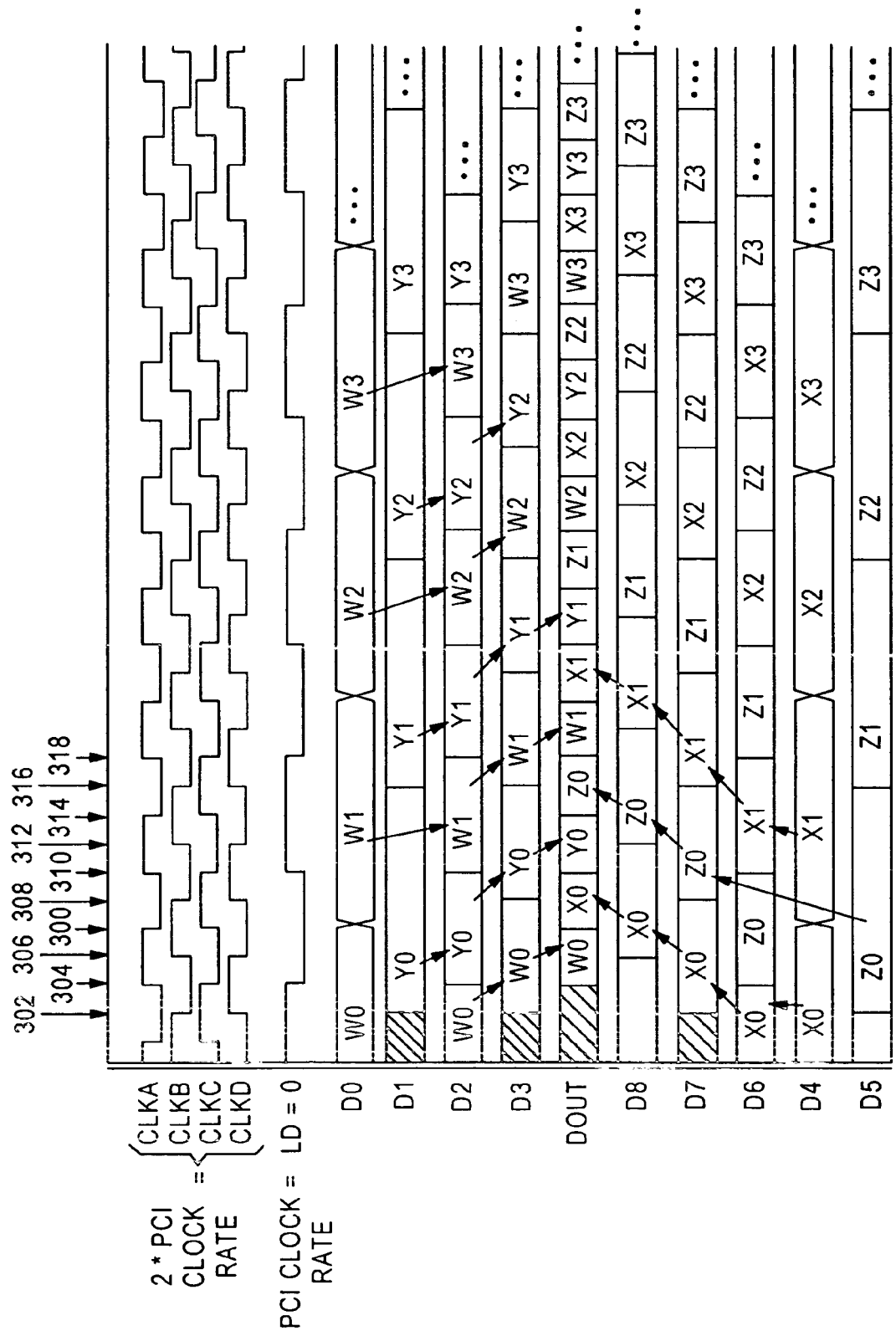
FIG. 5 is a timing diagram illustrating the transmission circuit of FIG. 3 operating according to quad data rate (QDR) mode, according to an embodiment of the present invention.

As illustrated in FIG. 5, when the logic 52 is set for performing Quad Data Rate (QDR) transmission, the logic 52 alternates the LD selection signal between "0" and "1" at the PCI clock rate, and the logic 52 outputs the clock signals (CLKA, CLKB, and CLKD) at twice the PCI clock rate. The logic 52 supplies the LD selection signal to the multiplexers 56 and 58 for selection between the data on data signal paths D0 and D1 by the multiplexer 56, and the data on data signal paths D4 and D5 for the multiplexer 58. Hence, the sequence of data supplied to the multiplexer 54 is controlled by the multiplexers 56 and 58; further, the sequence of input data (W, X, Y, Z) is further controlled by the flip-flops 64, 66, and 68, where the data supplied on the input path D8 is delayed relative to the input data on the D3 signal path, based on the flip-flop 66 being responsive to the CLKB signal which is 180° out of phase relative to the CLKB signal.

Hence, as illustrated below with respect to FIGS. 4 and 5, the circuit 50 is configured for outputting data at double data rates, or quad data rates, as needed, while maintaining the same clock reference for all latching and outputting of data.

Figure 1:
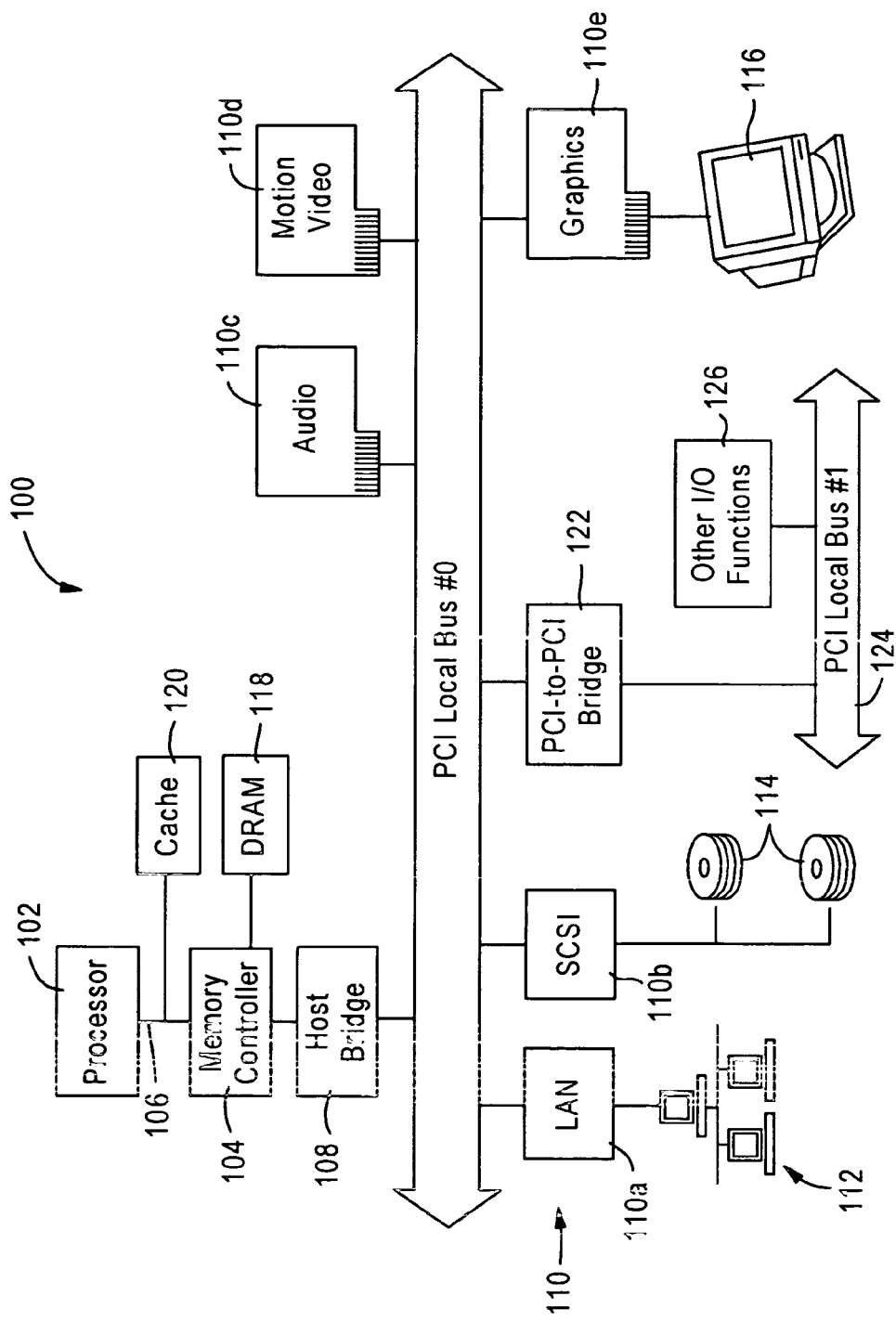
FIG. 1 is a block diagram of a conventional (PRIOR ART) implementation of a PCI based system.

FIG. 4 is a diagram illustrating a timing diagram illustrating operation of the circuit 50 according to double data rate, according to an embodiment of the present invention. Each of the clock signals (CLKA, CLKB, and CLKD) are output by the logic circuit 52 according to the PCI bus clock frequency. In addition, the logic 52 sets the selection signal (LB) to a value of "1", effectively disabling the inputs and D1 and D5 of the multiplexers 56 and 58 of FIG. 1 and setting the outputs D2 and D6 to equal the inputs D0 and D4, respectively.

As illustrated in FIG. 4, the data inputs D0 and D4 are supplied to the multiplexers 56 and 58, respectively, each PCI clock cycle prior to the rising edge of the clock signal CLKD. The data inputs W0 and X0 are latched by the flip-flops 64 and 68 in response to the rising edge of the clock signal CLKD at event 200. The output of the flip-flop 64 is supplied along the D3 signal path to the multiplexer 54, whereas the output D7 of the flip-flop 68 is latched by the flip-flop 66 in response to the rising edge of the clock signal (CLKB) at event 202. The clock signal CLKA is used as the selection signal for the multiplexer 54. Hence, the multiplexer 54 outputs at event 206 the data signal output from the flip-flop 64 (W0), and outputs at event 208 the data output by the flip-flop 66 (X0), based on the selection signal (clock signal CLKA).

Hence, the multiplexer 14 outputs the data supplied by the multiplexers 64 and 68 according to the sequence W0, X0, W1, X1, W2, X2, W3, X3, etc., at double the PCI clock rate based on the selection signal for the multiplexer 54 operating at the PCI clock rate. Hence, the data rate is doubled based on the two states of the clock being used to select two bits of data. In addition, the size of the data eye on bit line 55 is maximized based on the data on signal path D3 being prepared while the data on signal path D8 is driven, and vice versa. Hence, the selection signal (CLKA) transitions only while the input data is stable.

FIG. 5 is a timing diagram illustrating operation of the circuit 50 according to Quad Data Rate (QDR) mode, according to an embodiment of the present invention. As described above, the logic 52 is configured for outputting, in Quad Data Rate mode, the clock signals (CLKA, CLKB, and CLKD) at twice the PCI bus clock rate, and the mux selection signal (LD) at the same clock frequency as the PCI bus clock signal. Hence, the data inputs W, X, Y, and Z are supplied at the PCI bus clock rate which corresponds to the clock rate of the selection signal (LD). In the case of the D0 and D4 signal paths, QDR data transitions on signal paths D0 and D4 (e.g., from W0 to W1 on data path D0, and X0 to X1 on data path D4) occur when the selection signal LD is low, and prior to the next rising edge of the CLKD signal, for example at event 300. The supply of the PCI data Y, Z to the multiplexers 56 and 58 by the flip-flops 62 and 70 on signal paths D1 and D5, respectively, are controlled by the rising clock edge of the CLKD signal (e.g., at event 302).

As illustrated in FIG. 5, the data values W0 and X0 are output by the multiplexers 56 and 58 onto the respective signal paths D2 and D6 at event 302 in response to the LD selection signal being asserted at "1" value. Hence, the flip-flops 64 and 68 latch the respective data values W0 and X0 in response to the rising edge of the clock signal (CLKD) at event 302, causing the flip-flops 64 and 68 to output the data values W0 and X0 onto the output paths D3 and D7, respectively.

The data value W0 is output by the multiplexer 54 onto the signal path DOUT 55 at event 304 in response to the selection signal (CLKA) switching from a "0" value to a "1" value. The multiplexers 56 and 58 also begin outputting the Y0 and Z0 values supplied on the D1 and D5 signal paths, respectively, in response to the LD selection input switching from a "1" value to a "0" value at event 304.

The X0 value output by the flip-flop 68 onto signal path D7 is latched at event 306 into the flip-flop 66 in response to the rising edge of the clock signal (CLKB), causing the flip-flop 66 to output the latched value X0 onto the D8 signal path. Hence, the multiplexer 54 outputs the data value X0 at event 300 in response to the selection input (CLKA) switching from a "1" value to a "0" value.

At event 308, the flip-flops 64 and 68 latch the data values Y0 and Z0 output by the multiplexers 56 and 58, respectively, enabling the multiplexer 54 to output the data value Y0 at event 310 in response to the selection input CLKA switching from a zero ("0") value to a one ("1") value.

The data value Z0, having been output by the flip-flop 68 on the D7 signal path, is latched by the flip-flop 66 in response to the rising edge of the clock signal (CLKB) at event 312, enabling the multiplexer 54 to output the data values Z0 in response to the selection input (CLKA) switching from a one value ("1") to a zero value ("0") at event 314.

At event 316: the flip-flops 62 and 70 latch the data Y1 and Z1, respectively, and the flip-flops 64 and 68 latch the values W1 and X1 output by the multiplexers 56 and 58 based on the LD selection value having a one ("1") value. Hence, the latching of the data value W1 by the flip-flop 64 enables the multiplexer 54 to output the W1 value on the D3 signal path at event 318 in response to the selection input (CLKA) switching from a zero value ("0") to a one value ("1"). In addition, the LD selection signal switches from a one value ("1") to a zero value ("0") at event 318, causing the multiplexers 56 and 58 to output the data values supplied on inputs D1 and D5, respectively.

As apparent from the foregoing, the sequence is repeated for the remaining data inputs, enabling the multiplexer 54 to output the data onto a single PCI data pin at four times the PCI clock rate.

According to the disclosed embodiment, receive logic is used to provide enable signals to selected flip-flops, enabling the selected flip-flops to prepare for receipt of the PCI data using the same clock signal.

Figure 6:
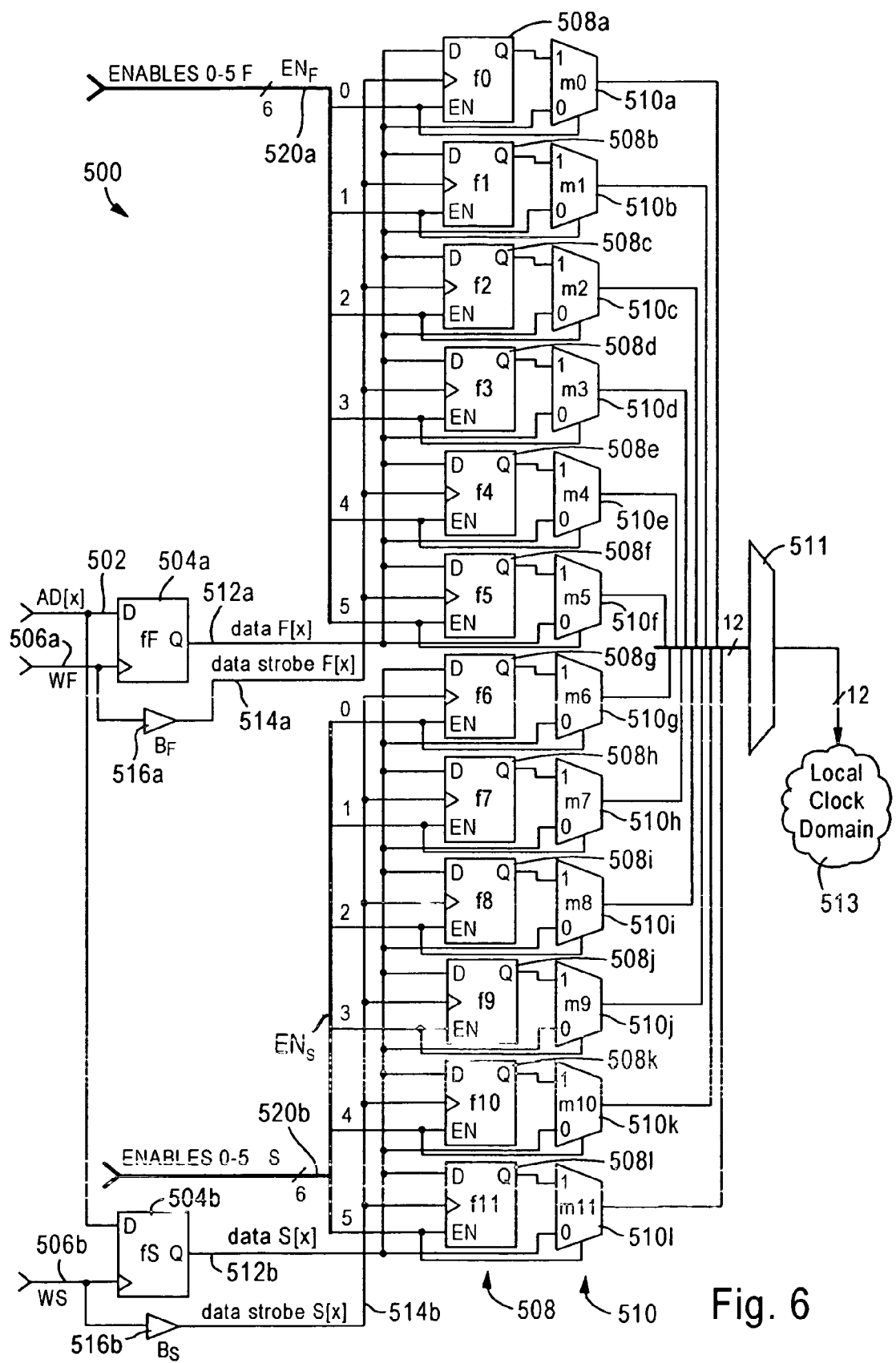
FIG. 6 is a diagram illustrating a data line latch module configured for latching PCI data from a PCI bit line of the PCI bus, according to either DDR mode or QDR mode, according to an embodiment of the present invention.
Figure 7:
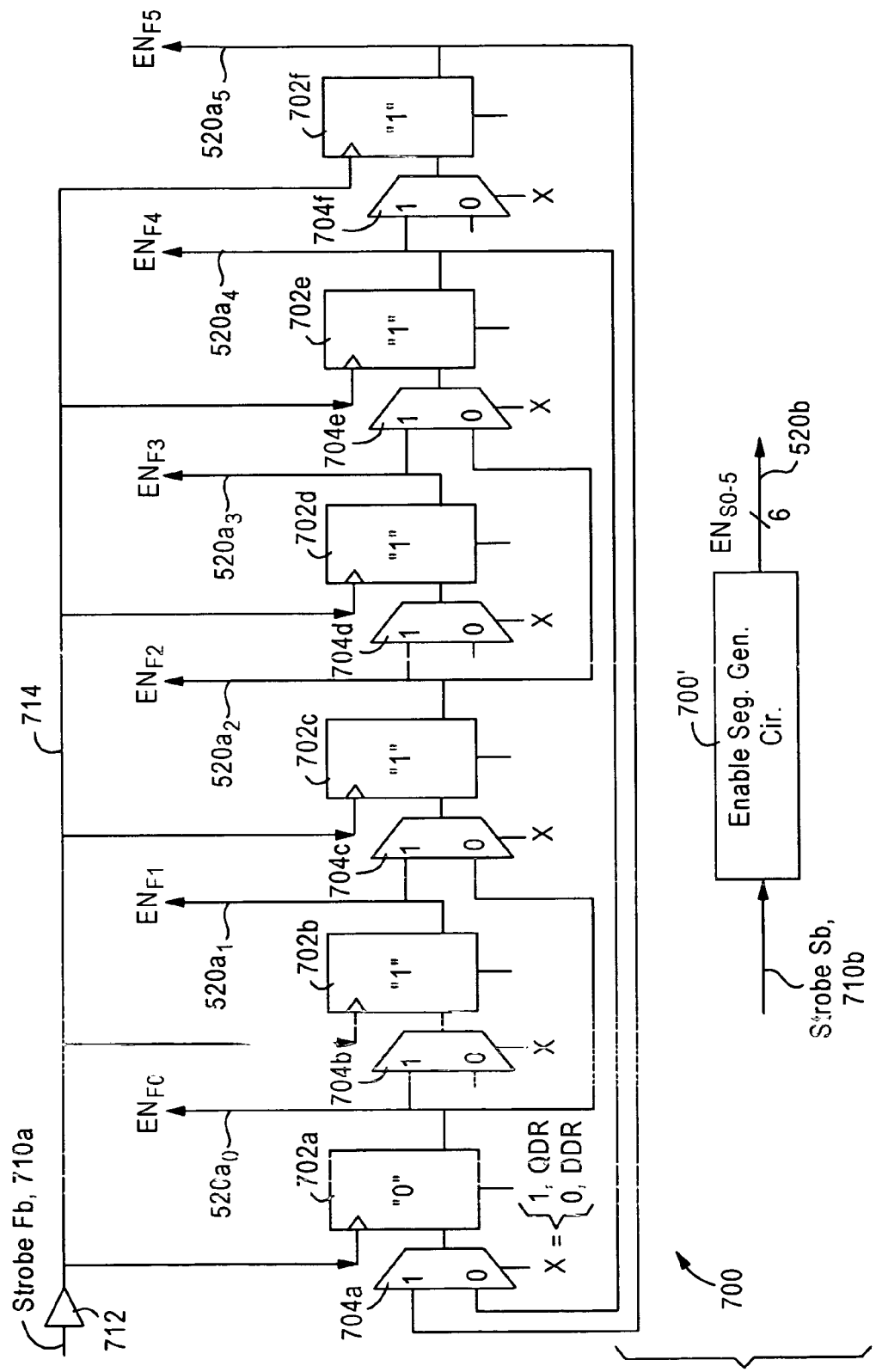
FIG. 7 is a diagram illustrating enable signal generation circuits configured for generating the enable signals of FIG. 6.
Figure 8:
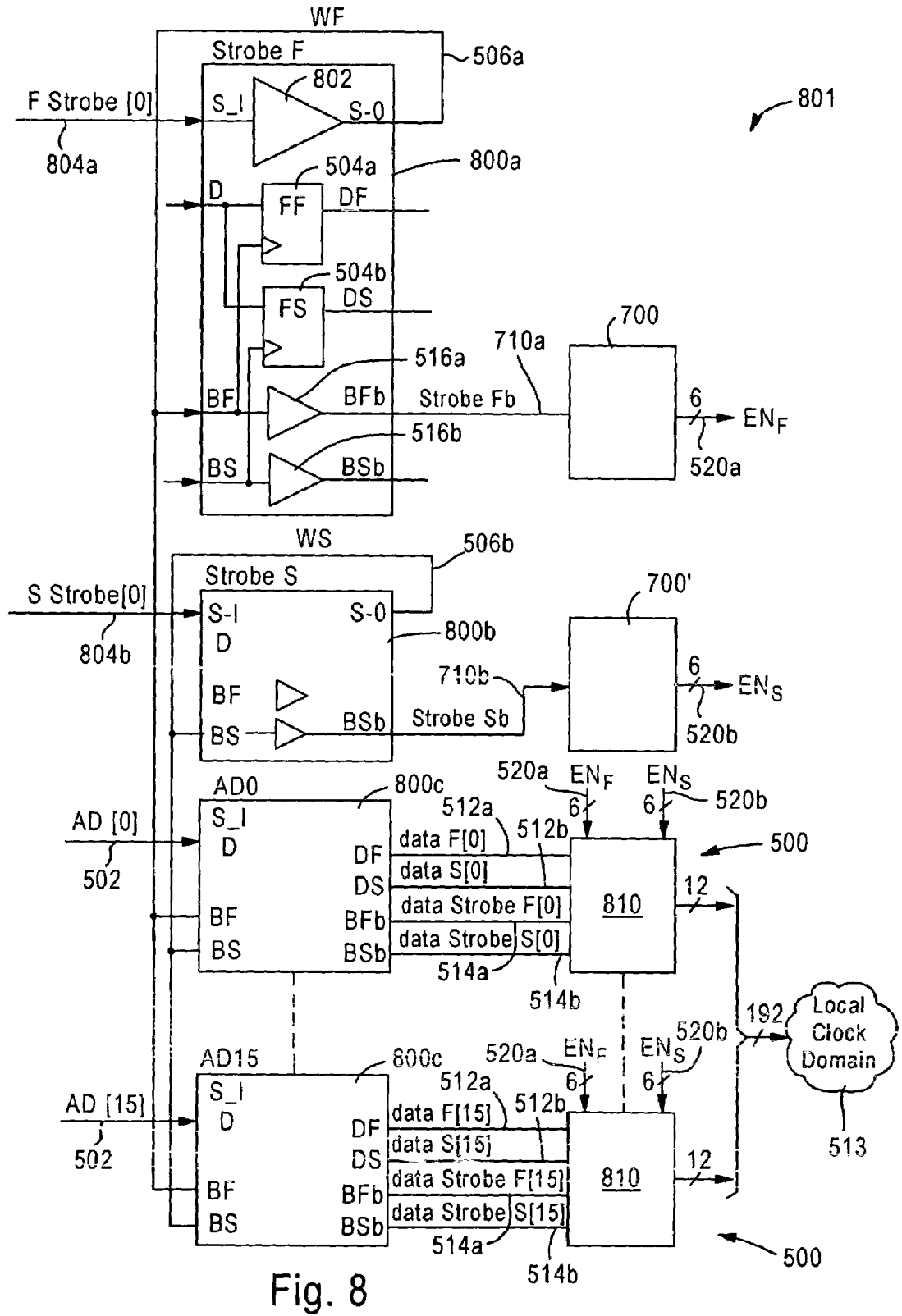
FIG. 8 is a diagram illustrating distribution of the strobe signals relative to the PCI data bit lines, according to an embodiment of the present invention.

FIGS. 6, 7, and 8 are diagrams illustrating the receive portion for a PCI interface 40, according to an embodiment of the present invention. In particular, FIG. 8 illustrates the receive portion having input cells 800a, 800b, and 800c. Each input cell (e.g., 800a) includes data line latch modules 500 for latching the respective data bits, and enable signal generation circuits 700 and 700' for providing the enable signals for the associated data line latch modules 500.

FIG. 6 illustrates a data line latch module 500 configured for latching a single bit 502 from the PCI bus. The data line latch module 500 is configured for converting the received serial data stream on the PCI bit line 502 into a parallel data word, and buffering between the PCI clock domain and the internal clock domain of the PCI bridge device.

Each of the primary flip-flops 504a and 504b, and the secondary flip-flops 508 of FIG. 6 are positive edge triggered flip-flops. The PCI data AD[x] supplied on the PCI input line 502 is latched by the primary flip-flop 504a in response to a locally-generated PCI strobe signal "WF" on signal path 506a. Data on the PCI input signal path 502 also is latched by the primary flip-flop 504b in response to a locally-generated PCI strobe signal "WS" on signal path 506b. As described below with respect to FIG. 8, the locally-generated PCI strobe signals "WF" and "WS" on signal paths 506a and 506b are generated by strobe input cells 800a and 800b, respectively, that broadcast respective PCI bus strobe signals "FSTROBE" and "SSTROBE" received from the PCI-X bus.

The primary flip-flop 504a outputs the latched value "dataF[x]" on data path 512a to the secondary flip-flops 508a, 508b, 508c, 508d, 508e, and 508f; the signal path 512a also supplies the latched value "dataF[x]" to the multiplexers 510a, 510b, 510c, 510d, 510e, and 510f. Similarly, the primary flip-flop 504b outputs the latched data dataS[x] onto data path 512b to the secondary flip-flops 508g, 508h, 508i, 508j, 508k, and 508l; the data path 512b also supplies the latched value "dataS[x]" to the multiplexers 510g, 510h, 510i, 510j, 510k, and 510l.

Each of the first group of secondary flip-flops (508a through 508f) has a corresponding enable signal $EN_{F0\text{-}5}$ that is supplied by an enable signal generation circuit 700, described below with respect to FIG. 7. Each of the first group of multiplexers (510a through 510f) also receives a corresponding one of the enable signals $EN_{F0\text{-}5}$ as a selection input. Each of the second group of secondary flip-flops (508g through 508l) has a corresponding enable signal $EN_{S0\text{-}5}$ that is supplied by the enable signal generation circuit equivalent to the circuit 700 described below with respect to FIG. 7. Each of the second group of multiplexers (510g through 510l) also receives a corresponding one of the enable signals $EN_{S0\text{-}5}$ as a selection input.

In addition, the first group of flip-flops (508a through 508f) receive a strobe signal (datastrobeF[x]) on the strobe signal path 514a, and the lower group of flip-flops (508g through 508l) receive a strobe signal (datastrobeS[x]) via the signal path 514b. Hence, each flip-flop 508 is configured for latching data in response to assertion of the corresponding enable signal on the enable signal path 520a or 520b, and based on its clock input 514a or 514b.

The strobe signals on strobe signal paths 506a and 506b, as well as the enable signals supplied on enable signal paths 520a and 520b, are generated by the strobe circuit 802 of FIG. 8 in a manner that ensures the incoming PCI data is latched, regardless of whether the data is supplied at a double data rate or quad data rate.

FIG. 7 is a diagram illustrating the enable signal generation circuit 700 for a corresponding portion of the data line latch module 500. The enable signal generation circuit 700 generates the enable signals $EN_{F0\text{-}5}$ for the first group of flip-flops (508a through 508f) of FIG. 5 based on the strobe signal "strobeFb" on line 710a. The circuit 700 includes a buffer 712 configured for buffering the strobe signal "strobeFb" and outputting the buffered strobe signal onto the signal path 714.

A second enable signal generation circuit 700', identical to the circuit 700, is implemented for generation of the enable signals $EN_{S0\text{-}5}$ for the second group of flip-flops (508g through 508l) based on the strobe signal "strobeSb" on line 710b. As described in the PCI-X E/M Addendum, the PCI bus strobe signal "FSTROBE" signal leads the PCI bus strobe signal "SSTROBE" by approximately a phase difference of 180°. Hence, the sequence of data AD[x] on the input signal path 502 is latched into the flip-flops according to the sequence 508a, 508g, 508b, 508h, 508c, 508i, 508d, 508j, 508e, 508k, 508f, and 508l, at which point the sequence is repeated.

The strobe enable signal generation circuit 700 is implemented as a shift register composed of flip-flops 702a, 702b, 702c, 702d, 702e, and 702f, and multiplexers 704a, 704b, 704c, 704d, 704e, and 704f. The flip-flops 702a through 702f are configured such that only one of the flip-flops (e.g., 702a) store a zero ("0") value representing an enable signal, and the remaining flip-flops (e.g., 702b through 702f) store a one ("1") value representing a disable signal. Each of the flip-flops 702a through 702f latch the supplied data in response to the strobe signal "strobeFb" on signal path 714 if the corresponding enable signal has a zero ("0") value.

Hence, the enable signal value ("0") is passed among the flip-flops 702a through 702f, based on the strobe signal "strobeFb", to enable the respective 508a through 508f flip-flops of FIG. 6 according to the appropriate sequence. The second strobe enable signal generation circuit 700', identical to the circuit 700, will be implemented for providing the enable signals $EN_{S0\text{-}5}$ to the respective flip-flops 508g through 508l based on the strobe signal "strobeSb" supplied to the associated flip-flops of the second strobe enable signal generation circuit.

The multiplexers 704a through 704f are used to configure the circuit 700 for DDR or QDR mode. If the multiplexers 704a through 704f receive a selection signal "X" that is set to "1" in QDR mode (X=1), the multiplexers 704a through 704f cause each flip-flop 702a through 702d to receive an output from a corresponding preceding flip-flop (e.g., 702a from 702f, 702b from 702a, etc.). If the multiplexers 704a through 704f receive a selection signal "X" that is set to "0" in DDR mode (X=0), the multiplexers 704a through 704f cause the outputs of a first group of the flip-flops (702a, 702c, 702e) to bypass a second group of the flip-flops (702b, 702d, 702f).

Hence, in FIG. 6 all the flip-flops 508 are used in QDR mode, however in DDR mode only flip-flops 508a, 508c, 508e, 508g, 508i, and 508k are used.

Referring to FIG. 6, the incoming PCI data AD[x] on the PCI bit line 502 are being supplied according to the PCI clock domain based on the incoming PCI bus strobe signals FSTROBE and SSTROBE, which are distributed throughout the PCI interfaces 40 as the strobe signals "WF" and "WS" on paths 506a and 506b, respectively. However, the PCI data AD[x] needs to be captured for latching and use in the local clock domain 513 of the PCI bridge device 10.

Hence, conversion between the PCI clock domain and the local clock domain of the PCI bridge device 10 is accomplished by latching the PCI data AD[x] data into the flip-flops 510, and holding the PCI data for latching by other flip-flops (not shown) within the device 10 according to the local clock domain.

The PCI data AD[x] input from the PCI signal path 502 is supplied to the flip-flops 504a and 504b via signal path 502: the flip-flop 504a latches the first data input on the signal path 502 based on the strobe signal "WF" on signal path 506a, and the flip-flop 504b latches the next data input on the signal path 502 based on the strobe signal "WS" on signal path 506b. The data latched by the flip-flops 504a and 504b are supplied to the first group of flip-flops (508a through 508f) and the second group of flip-flops (508g through 508l), respectively. The first group of flip-flops (508a through 508f) is latched by the data strobe "datastrobeF[x]" output by signal buffer 516a onto strobe line 514a, and second group of flip-flops (508g through 508l) are latched by the data strobe "datastrobeS[x]" output by signal buffer 516b onto strobe line 514b.

At the end of the PCI-X data burst, the strobe signals on lines 506a or 506b for the last bit of data from the PCI burst on the data line 502 are used by the flip-flops 504a or 504b to latch the last bit of data. Since the PCI burst has ended, there will be no subsequent data strobe signal on lines 514a or 514b to transfer the latched data on lines 512a or 512b into the flip flops 508. Hence, the multiplexers 510 are used to bypass the flip-flops 508 for the last PCI data bit latched by the flip-flops 504a and 504b.

As shown in FIG. 6, at the time that a flip-flop (e.g., 508a) is enabled for latching data by its corresponding enable signal (e.g., $EN_{F0}$=0), the corresponding multiplexer (e.g., 510a) is configured for supplying the input of the corresponding flip-flop (e.g., 508a) to an output path 511. As described above, the enable signal generation circuit 700 changes the enable values in response to a strobe signal "strobefb" on path 710a; hence, the multiplexer (e.g., 510a) outputs the input value until the next strobe signal that changes the corresponding enable signal value (e.g., $EN_{F0}$=0).

In response to the corresponding signal value being set to one (e.g., $EN_{F0}$=1), the multiplexer (e.g., 510a) outputs the data value (e.g., "dataF[x]") output by the corresponding flip-flop (e.g., 508a). Hence, if a multiplexer (e.g., 510a) receives a zero value (e.g., $EN_{F0}$=0), the multiplexer (e.g., 510a) enters bypass mode. Only one multiplexer 510 is in bypass mode at any time. In other words, the multiplexer (e.g., 510a) associated with the corresponding flip-flop (e.g., 508a) is configured for selecting the output of the corresponding flip-flop only if there is valid latched data in the flip-flop. Hence, if the strobe signal "datastrobeF[x]" ceases before the flip-flop (e.g., 508a) has latched the input data "dataF[x]" on input path 512a, the corresponding multiplexer (e.g., 510a) will still be able to propagate the data "dataF[x]" on the parallel data path 511 to the local clock domain 513.

FIG. 8 is a diagram illustrating a PCI bus latching module 801 having input cells 800a, 800b, and 800c configured for buffering and latching PCI strobe signals, the enable signal generation circuits 700 and 700', and elasticity buffers 810 for latching PCI data bits for the local clock domain 513, according to an embodiment of the present invention. The PCI bus latching module 801 of FIG. 8 is configured for latching sixteen bits (e.g., AD[0] through AD[15]) of a PCI bus; hence, the module 801 and the pair of strobe signals FSTROBE and SSTROBE are repeated four (4) times for a 64-bit PCI bus.

As illustrated in FIG. 8, the input cells 800a and 800b are configured for buffering the strobe signals FSTROBE[0] and SSTROBE[0] and outputting the buffered signals WF and WS on signal paths 506a and 506b, respectively. The input cells 800a and 800b also output strobe signals "strobeFb" and "strobeSb" on paths 710a and 710b to the enable signal generation circuits 700 and 700' based on the buffered signals WF and WS, respectively.

The enable signal generation circuits 700 and 700' supply their respective enable outputs $EN_F$ and $EN_S$ via paths 520a and 520b to the sixteen (16) elasticity buffers 810. Each elasticity buffer 810 in implementation includes the flip-flops 508 and the multiplexers 510 of FIG. 6. Hence, each input cell 800c in combination with a corresponding elasticity buffer 810 forms the data line latch module 500 of FIG. 6.

Each input cell 800a, 800b, and 800c includes a strobe buffer 802 configured for performing signal conditioning an incoming strobe signal (S_I). Each input cell 800a, 800b, and 800c also includes the flip-flop 504a, the flip-flop 504b, the buffer 516a, and the buffer 516b of FIG. 6. As shown in FIG. 8, the input cells 800a and 800b are used to buffer the PCI bus strobe signals FSTROBE and SSTROBE from the PCI bus (e.g., 16a) via respective signal paths 804a and 804b, and generate the strobe signals "strobeFb" and "strobeSb"; hence the flip-flops 506a and 504b are unused in cells 800a and 800b.

Each input cell 800c is used to latch a corresponding data bit AD[x] from the AD signal path 502. The data bit is supplied via the signal paths 512a, 512b to the corresponding elasticity buffer 810 for latching based on the corresponding set of strobes on lines 514a, 514b.

Since an incoming PCI bus strobe signal (e.g., FSTROBE or SSTROBE) cannot be evenly distributed to match all the strobed data bits without introducing timing issues, the disclosed embodiment ensures that the PCI bus strobe signals FSTROBE and SSTROBE on respective signal paths 804a and 804b encounter minimal loading, as well as encountering the same propagation delays as the data on the AD[x] signal path 502. Hence, the timing relationship between the input data and the corresponding strobe signals is preserved, without any errors introduced for example due to propagation delays relative to the data signal in the strobe signal.

Hence, buffer loading and strobe skew is minimized, since any localized delay encountered by a given input cell (e.g., 800c) is equal between the strobe cells and the input data. Although not shown, additional eight (8) additional input cells and elasticity buffers are used for capturing the eight (8) additional C/BE bits on the PCI bus 16a, which are used as ECC checkbits during PCI-X mode 2 operation. These additional 8 input cells are distributed among the four (4) strobe groups.

The disclosed embodiment also reduces the number of clock domains down to three clock domains (namely the FSTROBE clock domain, the SSTROBE clock domain, and the local clock domains), as opposed to the PCI-X E/M Addendum which would have required 12 clock domains.

It will be readily apparent that the signal and register names are by way of illustration only, and that various modifications may be implemented consistent with the scope of the claims.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an integrated PCI bridge device coupled to a PCI bus having PCI data lines, the method comprising:
   receiving PCI data from the PCI bus supplied at one of a double data rate mode or a quad data rate mode; and
   latching the PCI data based on:
   (1) supplying prescribed groups of the PCI data lines to respective PCI bus latching modules in the integrated PCI bridge device, each PCI bus latching module having a plurality of data line latch modules, each data line latch module configured for latching from a corresponding PCI data line, according to the one data rate mode, first and second PCI data values based on respective locally-generated first and second PCI strobe signals,
   (2) generating, in each PCI bus latching module, the corresponding locally-generated first and second PCI strobe signals based on supplying respective first and second PCI bus strobe signals received from the PCI bus to respective buffers, and supplying the same locally-generated first and second PCI strobe signals from the respective buffers to each of the data line latch modules in the corresponding PCI bus latching module, and (3) holding, in each data line latch module, the first and second PCI data values for at least a clock cycle of the respective locally-generated first and second PCI strobe signals.

2. The method of claim 1, wherein the holding in each data line latch module includes:
first latching the corresponding first and second PCI data values into respective first and second primary flip-flops in response to the respective locally generated first and second PCI strobe signals;
first supplying the first PCI data value from the first primary flip-flop to a first group of secondary flip-flops for storage thereof in a selected one of the first group of secondary flip-flops based on a detected presence of a subsequent locally-generated first PCI strobe signal; and
second supplying the second PCI data value from the second primary flip-flop to a second group of secondary flip-flops for storage thereof in a selected one of the second group of secondary flip-flops based on a detected presence of a subsequent locally-generated second PCI strobe signal.

3. The method of claim 2, wherein the holding further includes third supplying, from each secondary flip-flop, the corresponding latched PCI data value until a detected presence of another subsequent corresponding locally-generated PCI strobe signal.

4. The method of claim 3, wherein the first supplying step and the second supplying step each comprise:
supplying an asserted enable signal to the selected one of the corresponding group of secondary flip-flops and a deasserted enable signal to the others of the corresponding group of second flip-flops; and
successively changing the assertion of the enable signal to another one of the others of the corresponding group of second flip-flops in a prescribed sequence, based on whether the PCI data is latched according to one of the double data rate mode or the quad data rate mode.

5. The method of claim 4, wherein the holding includes bypassing one of the secondary flip-flops based on selecting one of an input of the corresponding secondary flip-flop or an output of the corresponding secondary flip-flop for supply to an output node, based on the corresponding enable signal.

6. The method of claim 1, further comprising outputting PCI output data onto the corresponding one of the PCI data lines according to the one data rate mode, based on supplying to an output multiplexer a first output stream according to a first clock signal and a second output stream according to a second clock signal having a prescribed phase delay relative to the first clock signal, the output multiplexer selecting between the first output stream and the second output stream in response to a third clock signal supplied to a selection input of the output multiplexer, the third clock signal having a second prescribed phase delay relative to the first clock signal, the first, second, and third clock signals based on a prescribed PCI clock.

7. The method of claim 6, wherein the outputting PCI output data further includes, for the quad data rate mode:
generating the first output stream based on multiplexing first and second data streams according to a fourth clock signal having a clock rate corresponding to the prescribed PCI clock, the first, second, and third clock signals having a clock rate that is twice the prescribed PCI clock, the first output stream synchronized relative to the first clock signal; and
generating the second output stream based on multiplexing third and fourth data streams into a multiplexed stream based on the fourth clock signal, and delaying the multiplexed stream according to the second clock signal.

8. An integrated PCI bridge device, the integrated PCI bridge device comprising:
first and second PCI interfaces, each comprising:
(1) a plurality of PCI bus latching modules configured for receiving respective prescribed groups of PCI data lines, each PCI bus latching module having a plurality of data line latch modules, each data line latch module configured for latching from a corresponding PCI data line, according to one of a double data rate mode or a quad data rate mode, first and second PCI data values based on respective locally-generated first and second PCI strobe signals,
(2) each PCI bus latching module further comprising first and second buffers configured for generating the corresponding locally-generated first and second PCI strobe signals based on respective first and second PCI bus strobe signals received from the PCI bus, the same locally-generated first and second PCI strobe signals supplied from the respective first and second buffers to each of the data line latch modules in the corresponding PCI bus latching module,
(3) each data line latch module configured for holding the corresponding first and second PCI data values for at least a clock cycle of the respective locally-generated first and second PCI strobe signals; and
each first and second PCI interface further comprising means for outputting output data onto the corresponding prescribed group of PCI data lines according to the one data rate based on a data rate configuration signal.

9. The device of claim 8, wherein each data line latch module includes:
an input cell including first and second primary flip-flops configured for latching the corresponding first and second PCI data values in response to the locally-generated first and second PCI strobe signals, respectively; and
an elasticity buffer including:
(1) a first group of secondary flip-flops configured for receiving the first PCI data value latched by the first primary-flip flop, each configured for selectively latching the first PCI data value in response to a subsequent locally-generated first PCI strobe signal and based on a corresponding asserted enable signal, and
(2) a second group of secondary flip-flops configured for receiving the second PCI data value latched by the second primary flip-flop, each configured for selectively latching the second PCI data value in response to a subsequent locally-generated second PCI strobe signal and based on a corresponding asserted enable signal.

10. The device of claim 9, wherein each elasticity buffer includes multiplexers coupled to the secondary flip-flops, respectively, each multiplexer configured for supplying one of the first PCI data value output from the first primary flip-flop, or a corresponding output of the secondary flip-flop, to an output node for latching in a clock domain of the integrated PCI bridge device, in response to the corresponding enable signal being deasserted.

11. The device of claim 10, wherein each PCI bus latching module further comprises:
a first enable signal generation circuit configured for successively supplying the deasserted enable signal to the selected one of the first group of secondary flip-flops and the asserted enable signal to the others of the first group of secondary flip-flops in response to the corresponding locally generated first PCI strobe signal; and a second enable signal generation circuit configured for successively supplying the deasserted enable signal to the selected one of the second group of secondary flip-flops and the asserted enable signal to the others of the corresponding group of secondary flip-flops in response to the corresponding locally generated second PCI strobe signal; and each of the first and second enable signal generation circuits configured for successively changing the assertion of the corresponding enable signal to another one of the others of the corresponding group of second flip-flops in a prescribed sequence, based on whether the PCI data is latched according to one of the double data rate mode or the quad data rate mode.

12. The device of claim 8, wherein the means for outputting includes an output multiplexer configured for outputting PCI output data onto the corresponding one of the PCI data lines according to the one data rate mode, based on receiving a first output stream according to a first clock signal and a second output stream according to a second clock signal having a prescribed phase delay relative to the first clock signal, the output multiplexer selecting between the first output stream and the second output stream in response to a third clock signal supplied to a selection input of the output multiplexer, the third clock signal having a second prescribed phase delay relative to the first clock signal, the first, second, and third clock signals based on a prescribed PCI clock.

13. The device of claim 12, wherein the means for outputting further includes:

means for generating the first output stream based on multiplexing first and second data streams according to a fourth clock signal having a clock rate corresponding to the prescribed PCI clock, the first, second, and third clock signals having a clock rate that is twice the prescribed PCI clock, the first output stream synchronized relative to the first clock signal; and means for generating the second output stream based on multiplexing third and fourth data streams into a multiplexed stream based on the fourth clock signal, and delaying the multiplexed stream according to the second clock signal.

* * * * *